(12) United States Patent
Iyer et al.

(10) Patent No.: US 10,715,913 B2
(45) Date of Patent: Jul. 14, 2020

(54) NEURAL NETWORK-BASED LOUDSPEAKER MODELING WITH A DECONVOLUTION FILTER

(71) Applicant: Harman International Industries, Incorporated, Stamford, CT (US)

(72) Inventors: Ajay Iyer, Murray, UT (US); Douglas J. Button, Simi Valley, CA (US)

(73) Assignee: Harman International Industries, Incorporated, Stamford, CT (US)

(*) Notice: Subject to any disclaimer, the term of this patent is extended or adjusted under 35 U.S.C. 154(b) by 0 days.

(21) Appl. No.: 16/570,844

(22) Filed: Sep. 13, 2019

(65) Prior Publication Data
US 2020/0007986 A1 Jan. 2, 2020

Related U.S. Application Data

(62) Division of application No. 15/099,433, filed on Apr. 14, 2016, now Pat. No. 10,425,730.

(51) Int. Cl.
*G06F 15/18* (2006.01)
*H04R 3/04* (2006.01)
(Continued)

(52) U.S. Cl.
CPC .............. *H04R 3/04* (2013.01); *G05B 13/027* (2013.01); *G06F 3/165* (2013.01); *H04R 3/00* (2013.01); *H04R 29/001* (2013.01); *H04S 7/305* (2013.01)

(58) Field of Classification Search
CPC .......... H04R 3/04; H04R 3/00; H04R 29/001; G05B 13/027; G06F 3/165; H04S 7/305
(Continued)

(56) References Cited

U.S. PATENT DOCUMENTS 6,954,745 B2 * 10/2005 Rajan .................... G10L 21/028
704/E21.013
9,426,589 B2 * 8/2016 Udesen .................. H04R 25/70
(Continued)

FOREIGN PATENT DOCUMENTS

CN 1505440 A 6/2004
JP 2001-057697 A 2/2001

OTHER PUBLICATIONS

Potirakis et al., "Time-Domain Nonlinear Modeling of Practical Electroacoustic Transducers", Journal of the Audio Engineering Society, Jun. 1, 1999, vol. 47, No. 6, pp. 447-468.

*Primary Examiner* — Huan Hoang
(74) *Attorney, Agent, or Firm* — Artegis Law Group, LLP (57) ABSTRACT

A technique for controlling a loudspeaker system with an artificial neural network includes filtering, with a deconvolution filter, a measured system response of a loudspeaker and a reverberant environment in which the loudspeaker is disposed to generate a filtered response, wherein the measured system response corresponds to an audio input signal applied to the loudspeaker while the loudspeaker is disposed in the reverberant environment. The techniques further include generating, via a neural network model, an initial neural network output based on the audio input signal, comparing the initial neural network output to the filtered response to determine an error value, and generating, via the neural network model, an updated neural network output based on the audio input signal and the error value.

19 Claims, 8 Drawing Sheets

(51) Int. Cl.
*H04R 3/00* (2006.01)
*G05B 13/02* (2006.01)
*G06F 3/16* (2006.01)
*H04R 29/00* (2006.01)
*H04S 7/00* (2006.01)

(58) Field of Classification Search
USPC .......................................................... 706/22
See application file for complete search history.

(56) References Cited

U.S. PATENT DOCUMENTS

| | | |
|---|---|---|
| 2008/0037804 A1 | 2/2008 | Shmunk |
| 2008/0292108 A1 | 11/2008 | Buck et al. |
| 2010/0316228 A1 | 12/2010 | Baran et al. |
| 2012/0002823 A1 | 1/2012 | Kanishima et al. |
| 2014/0044273 A1 | 2/2014 | Hashimoto et al. |
| 2014/0270216 A1 | 9/2014 | Tsilfidis et al. |

* cited by examiner

NEURAL NETWORK-BASED LOUDSPEAKER MODELING WITH A DECONVOLUTION FILTER

CROSS-REFERENCE TO RELATED APPLICATIONS

This application is a divisional of the co-pending U.S. patent application titled, "NEURAL NETWORK-BASED LOUDSPEAKER MODELING WITH A DECONVOLUTION FILTER," filed on Apr. 14, 2016 and having Ser. No. 15/099,433. The subject matter of this related application is hereby incorporated herein by reference.

BACKGROUND

Field of the Various Embodiments

The various embodiments relate generally to analyzing loudspeaker systems and, more specifically, to neural network-based loudspeaker modeling with a deconvolution filter.

Description of the Related Art

Modeling the behavior of loudspeakers is a common step when designing and manufacturing an audio system. For example, a manufacturer may collect data for a loudspeaker once the loudspeaker reaches the end of a factory line in order to model the specific behavior and characteristics of the loudspeaker. The resulting model may then be implemented in a control system that corrects for linear and/or non-linear distortion of the loudspeaker during operation, thereby enabling a desired loudspeaker response to be achieved. Such modeling is sometimes performed with an artificial learning architecture, such as an artificial neural network.

In machine learning, artificial neural networks include algorithmic models inspired by biological neural networks that are used to estimate or approximate functions that can depend on a large number of inputs. For example, artificial neural networks may be presented as systems of interconnected "neurons" that exchange messages with each other, where connections between each neuron have a numeric weight that can be tuned based on experience. Thus, neural networks may be considered adaptive to various inputs and thereby capable, in a sense, of learning.

In the context of loudspeaker modeling, an artificial neural network may be trained using measurements that are ideally taken in an anechoic chamber, in which acoustic reflections are significantly damped. Thus, during training, when the loudspeaker being modeled by the artificial neural network outputs a response to a known input stimulus in the form of a pressure wave, the response is received directly by the microphone or sensor employed for the training; no significant acoustic reflections off surfaces of the anechoic chamber are typically detected by the microphone or sensor. Consequently, the measurement at the microphone or sensor includes only the response of the loudspeaker and some path losses, which allows the artificial neural network to learn the dynamic behavior of the loudspeaker very accurately.

One drawback of the above approach is that anechoic chambers are not always available for training artificial neural networks associated with particular loudspeakers. Moreover, even if an anechoic chamber were readily available for testing and training, the use of such a chamber is not readily scalable for use in a mass production environment. Furthermore, the training of an artificial neural network in a reverberant environment, such as a "live room" with significant wall reflections, is impracticable because the reverberations of the response from the walls of the room necessarily impact the dynamic response of the loudspeaker. Thus, an artificial neural network cannot accurately learn the dynamic behavior of a loudspeaker in such an environment.

As the foregoing illustrates, more effective techniques for training artificial neural networks for loudspeaker control systems would be useful.

SUMMARY

Embodiments of the present disclosure set forth a computer-implemented method of generating a filter for a loudspeaker control system. The method includes receiving a measured system output of a loudspeaker and a reverberant environment in which the loudspeaker is disposed, via a sensor, extracting a head portion from the measured system output, wherein the head portion includes a measured output of the loudspeaker, determining an inverse of a response of the reverberant environment based on the head portion and the measured system output, and generating the filter based on the inverse of the response.

Further embodiments provide, among other things, a system and a non-transitory computer-readable medium configured to implement the method set forth above.

At least one advantage of the disclosed techniques is that a response of a reverberant environment in which a loudspeaker is disposed can be reduced by 20 db or more by a deconvolution filter. Consequently, a neural network of a loudspeaker system can be trained in the reverberant environment to remove distortion in the loudspeaker response, even though reverberations can be generated in the reverberant environment that would normally be mixed with the response of the loudspeaker.

BRIEF DESCRIPTION OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

DETAILED DESCRIPTION

In the following description, numerous specific details are set forth to provide a more thorough understanding of the embodiments of the present disclosure. However, it will be apparent to one of skill in the art that the embodiments of the present disclosure may be practiced without one or more of these specific details.

Figure 1:
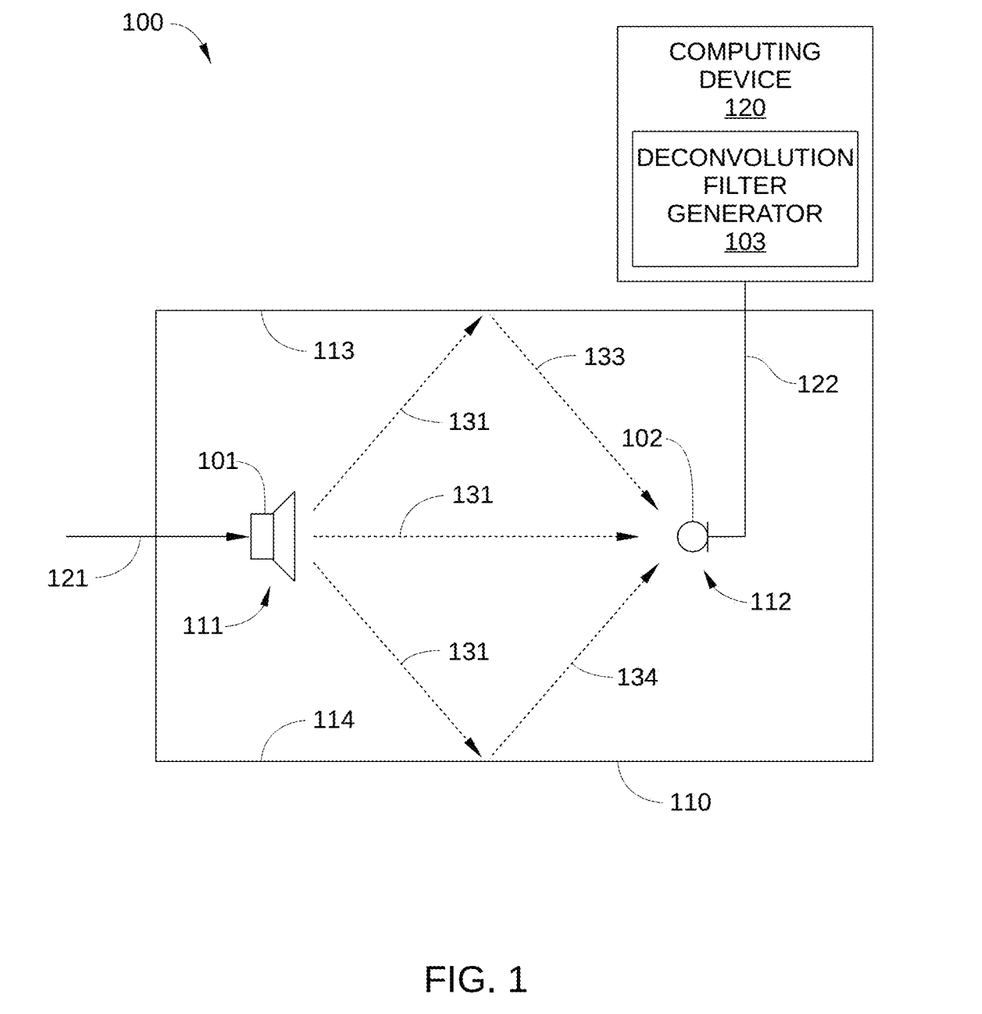
FIG. 1 illustrates a filter generation system configured to implement one or more aspects of the various embodiments.

FIG. 1 illustrates a filter generation system 100 configured to implement one or more aspects of the various embodiments. Filter generation system 100 includes, without limitation, a loudspeaker 101 and a sensor 102 that are disposed within a reverberant environment 110. More specifically, loudspeaker 101 is disposed in a first location 111 in reverberant environment 110 and sensor 102 is disposed in a second location 112 in reverberant environment 110. In addition, filter generation system 100 includes a deconvolution filter generator 103 that resides in a computing device 120.

Loudspeaker 101 is configured to transform an input stimulus 121 (e.g., an audio signal) into a loudspeaker output 131, such as sound waves. Loudspeaker 101 may be implemented in any technically feasible fashion. For example, and without limitation, in some embodiments loudspeaker 101 may be a cone loudspeaker, a dome loudspeaker, a horn loudspeaker, or a planar loudspeaker (e.g., an electrostatic loudspeaker). It is noted that loudspeaker output 131 may be emitted omni-directionally from loudspeaker 101. Consequently, a portion of loudspeaker output 131 impinges on and is reflected from interior surfaces 113 and 114 of reverberant environment 110 as room responses 133 and 134, respectively. Thus, room response 133 and room response 134 are reverberations of loudspeaker output 131 that each include a signal similar to loudspeaker output 131, but delayed and having a lower amplitude.

Sensor 102 is configured to transform received pressure waves into a measured response 122, and may include without limitation, a microphone or other pressure sensor. Thus, in the embodiment in FIG. 1, sensor 102 receives loudspeaker output 131, room response 133, and room response 134, and generates measured response 122, which is a system response of loudspeaker 101 and reverberant environment 110. Measured response 122 may be a pressure measurement, an audio signal derived from a pressure measurement, or any other technically feasible form of measured response. Thus, measured response 122 may include an electrical signal that represents one or more characteristics of loudspeaker output 131, such as the amplitude, phase, frequency response, and/or sound pressure level (SPL), etc. of loudspeaker output 131. Similarly, measured response 122 may include an electrical signal that represents one or more characteristics of room response 133 and of room response 134, such as the amplitude, phase, frequency response, and/or SPL, etc. of room response 133 and room response 134. Measured response 122 may include, without limitation, a pressure produced by loudspeaker 101, or any other technically feasible value that is indicative of loudspeaker 101 operation.

Deconvolution filter generator 103 is configured to generate a deconvolution filter, i.e., a dereverberation filter, for loudspeaker 101 when loudspeaker 101 and sensor 102 are part of a loudspeaker system that includes a control system configured to correct for linear and/or non-linear distortion of loudspeaker 101 and improve the quality of loudspeaker output 131. More specifically, deconvolution filter generator 103 is configured to generate a deconvolution filter for loudspeaker 101 when loudspeaker 101 is disposed in first location 111 of reverberant environment 110 and sensor 102 is disposed in second location 112 of reverberant environment 110. Deconvolution filter generator 103 may reside in computing device 120 and be implemented in any technically feasible fashion. For example, and without limitation, deconvolution filter generator 103 may be a software module that is run by computing device 120, firmware included in computing device 120, or hardware included in computing device 120, such as an application-specific integrated circuit (ASIC) or a field programmable gate array (FPGA), or any combination thereof. One embodiment of computing device 120 is described below in conjunction with FIG. 2.

Figure 2:
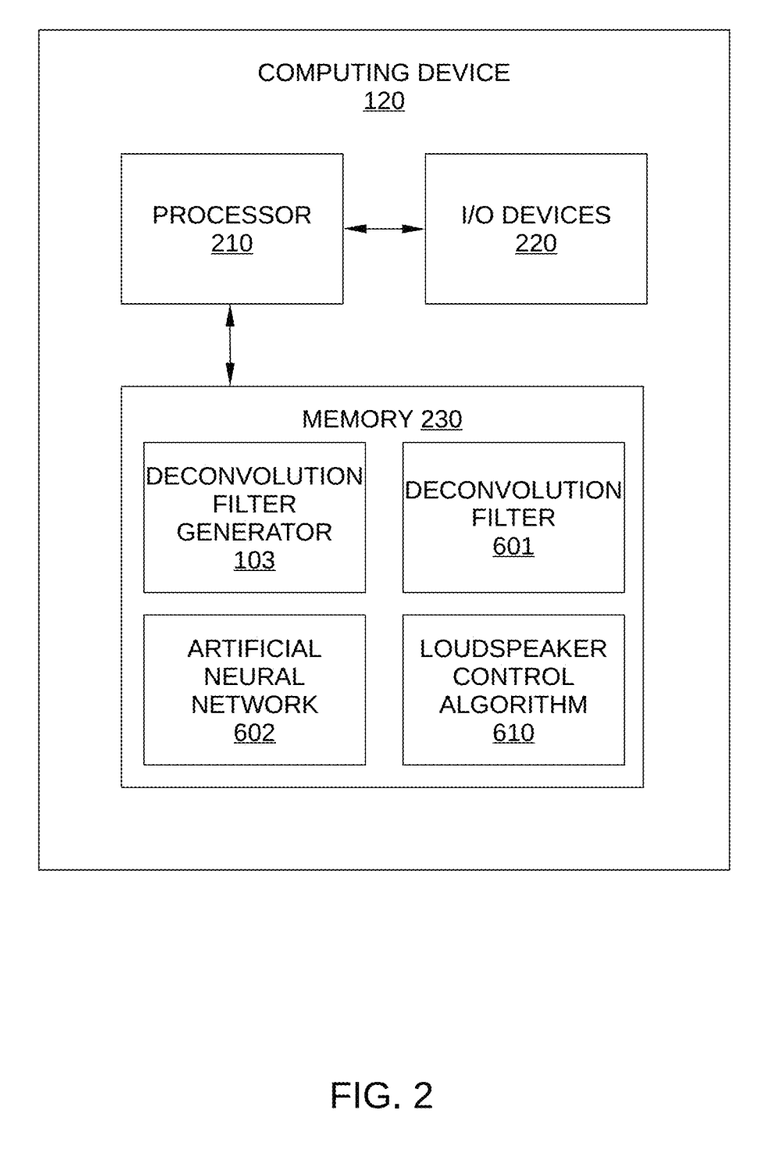
FIG. 2 is a more detailed illustration of the computing device of FIG. 1, according to various embodiments.

FIG. 2 is a more detailed illustration of the computing device of FIG. 1, according to various embodiments. Computing device 120 is configured to implement one or more aspects of filter generation system 100 of FIG. 1, according to various embodiments. Computing device 120 may be any type of device capable of executing application programs including, without limitation, instructions associated with deconvolution filter generator 103, a deconvolution filter, such as a deconvolution filter 601, an artificial neural network of a loudspeaker system, such as an artificial neural network 602 and/or a loudspeaker control algorithm, such as an artificial neural network 610. Deconvolution filter 601 artificial neural network 602, and loudspeaker control algorithm 610 are described below in conjunction with FIG. 6. For example, and without limitation, computing device 120 may be a laptop, a tablet, a smartphone, etc. As shown, computing device 120 includes, without limitation, a processor 210, input/output (I/O) devices 220, and a memory 230.

Processor 210 may be implemented as a central processing unit (CPU), a graphics processing unit (GPU), an ASIC, an FPGA, any other type of processing unit, or a combination of different processing units. In general, processor 210 may be any technically feasible hardware unit capable of processing data and/or executing software applications to facilitate operation of filter generation system 100 of FIG. 1 and/or loudspeaker system 600, as described herein. Thus, in some embodiments, processor 210 may be configured as a controller for filter generation system 100 and/or loudspeaker system 600. Among other things, and without limitation, processor 210 may be configured to execute instructions associated with deconvolution filter generator 103, artificial neural network 602, and/or loudspeaker control algorithm 610.

Figure 6:
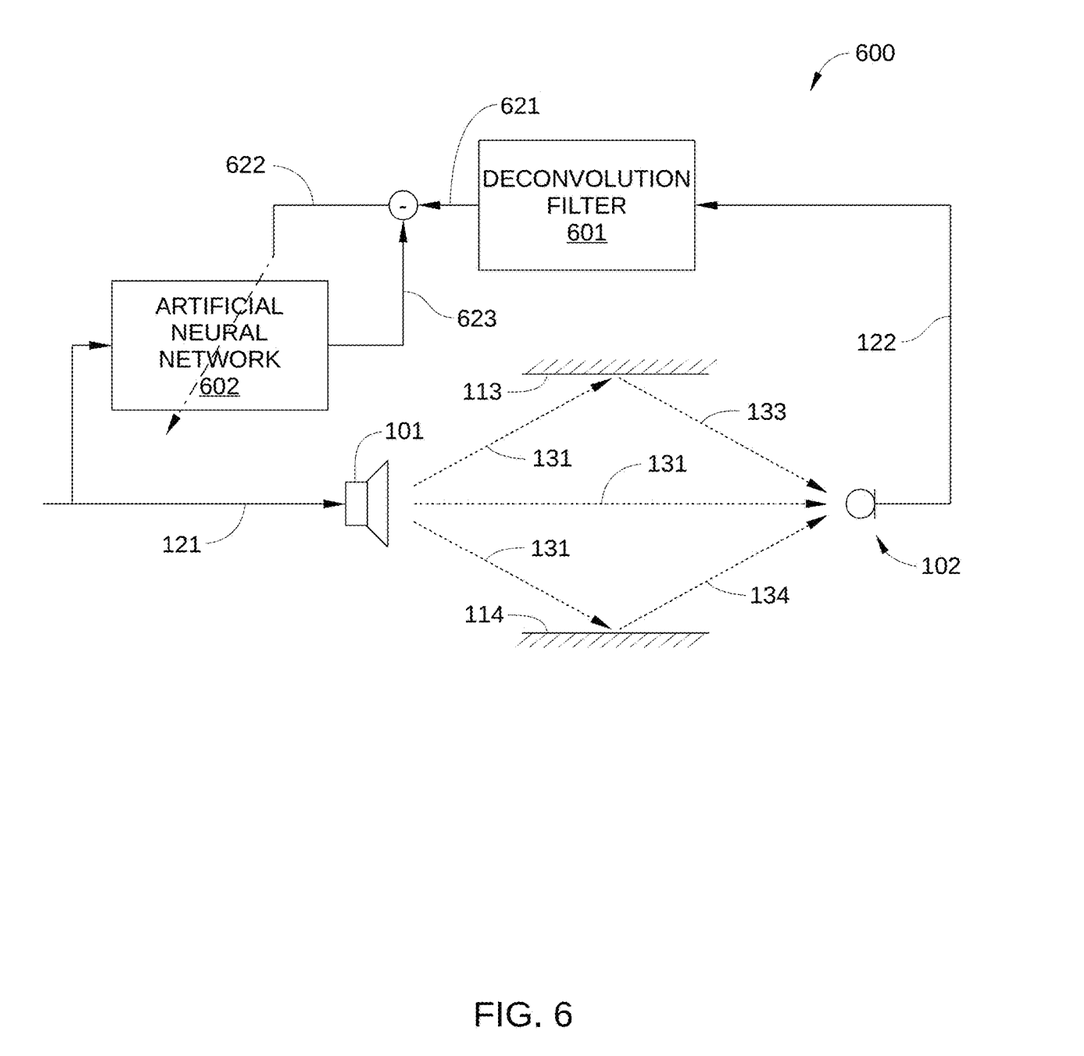
FIG. 6 illustrates a loudspeaker system configured to implement one or more aspects of the various embodiments.

I/O devices 220 may include input devices, output devices, and devices capable of both receiving input (e.g., input stimulus 121, measured response 122, etc.) and providing output (e.g., an artificial neural network output 623, shown in FIG. 6). Memory 230 may include a memory module or a collection of memory modules. As shown, in some embodiments, some or all of deconvolution filter generator 103 and/or artificial neural network 602 may reside in memory 230 during operation.

Computing device 120 may be implemented as a standalone chip, such as a microprocessor, or as part of a more comprehensive solution that is implemented as an application-specific integrated circuit (ASIC), a system-on-a-chip (SoC), and so forth. Generally, the computing device 120 may be configured to coordinate the overall operation of a computer-based system, such as filter generation system 100 and/or loudspeaker system 600. In other embodiments, computing device 120 may be coupled to, but separate from such a computer-based system. In such embodiments, the computer-based system may include a separate processor that transmits data, such as input stimulus 121, to computing device 120, which may be included in a consumer electronic device, such as a personal computer, and the like. However, the embodiments disclosed herein contemplate any technically feasible system configured to implement the functionality associated with various components of filter generation system 100 and/or loudspeaker system 600, in any combination.

Returning to FIG. 1, reverberant environment 110 may be any room, vehicle interior, or other space in which loudspeaker 101 and sensor 102 are disposed that is not equivalent to an anechoic chamber. For example and without limitation, reverberant environment may 110 be a passenger compartment in a vehicle or a room in a building that includes a high fidelity, low-distortion sound reproduction system, such as a home theater venue, a commercial entertainment venue, and the like. Because reverberant environment 110 is not anechoic, sound reflections from interior surfaces 113 and 114 are not significantly damped. Therefore, when input stimulus 121 is applied to loudspeaker 101, and loudspeaker 101 emits a response in the form of a pressure wave, such as loudspeaker output 131, sensor 102 receives a system response (i.e., loudspeaker output 131 plus room response 133 plus room response 134), rather than simply a loudspeaker response (i.e., loudspeaker output 131). It is noted that such a system response may include any number of room responses from the various reflective surfaces in reverberant environment 110, and is not limited to room response 133 and room response 134. One such system response is illustrated in FIG. 3.

Figure 3:
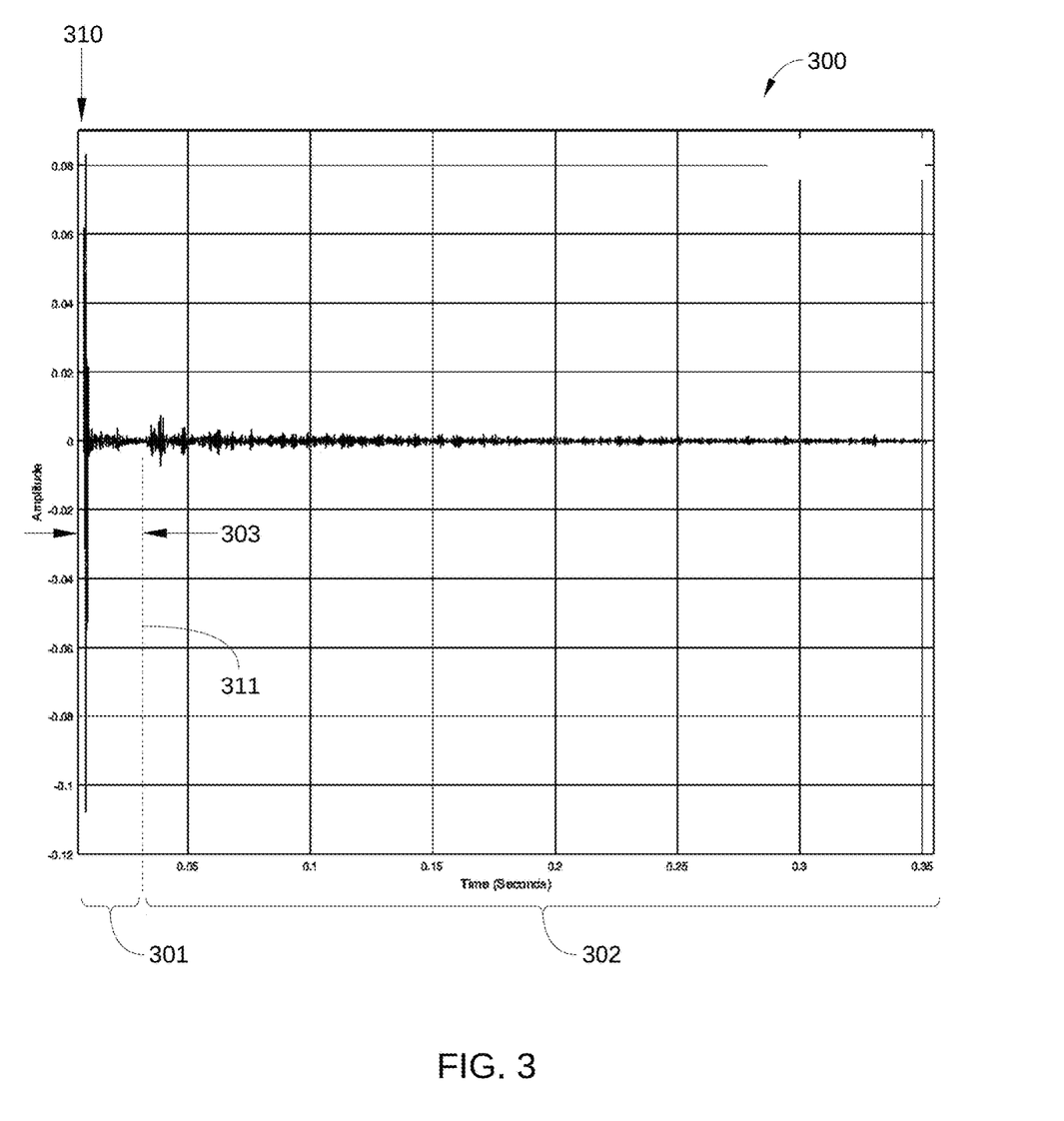
FIG. 3 illustrates a time domain response of a loudspeaker in the filter generation system of FIG. 1 recorded by a sensor, according to various embodiments.

FIG. 3 illustrates a time domain response of a loudspeaker in the filter generation system of FIG. 1 recorded by sensor 102, according to various embodiments. System output 300 is generated when loudspeaker 110 and sensor 102 are disposed in reverberant environment 110 and input stimulus 121 is applied to loudspeaker 110, thus, system output 300 is a system response that includes loudspeaker output 131, room response 133, and room response 134 of FIG. 1. As such, system output 300 includes a head portion 301 and a tail portion 302.

Head portion 301 begins with an initial portion 310 of the response of loudspeaker 101, such as the first sound waves received by sensor 102, and ends at a truncation point 311. Thus, head portion 301 includes an output of loudspeaker 101 received directly by sensor 102, i.e., loudspeaker output 131. Furthermore, in some embodiments, head portion 301 includes little or no portion of the response of reverberant environment 110, i.e., room response 133 or room response 134. Head portion 301 does not include room response 133 or room response 134 because loudspeaker output 131 follows a direct path to sensor 102, whereas room response 133 and room response 134 each follow longer paths to sensor 102. Consequently, room response 133 and room response 134 each arrive at sensor 102 after a significant portion of loudspeaker output 131 has arrived at sensor 102, that is, the portion of loudspeaker output 131 included in head portion 301.

By contrast, tail portion 302 may begin at or near truncation point 311, and continues to any technically feasible point in the time domain, for example several seconds after truncation point 311. Thus, tail portion 302 generally includes some later arriving portion of loudspeaker output 131 as well as room response 133 and room response 134. Consequently, tail portion 302 includes a response of loudspeaker 101 and a response of reverberant environment 110. Generally, a time delay 303 between the initial arrival time of loudspeaker output 131 and the initial arrival time of room response 133 and/or room response 134 is a function of the relative positions of loudspeaker 101, interior surfaces 113 and 114, and sensor 102; truncation point 311 may be selected to substantially coincide with the expiration of time delay 303. Alternatively, truncation point 311 may be selected based on any other technically feasible criteria, such as a point prior to reception of the first reverberation of loudspeaker output 131.

In some embodiments, loudspeaker 101 and sensor 102 may be part of a loudspeaker system that includes a control system configured to correct for linear and/or non-linear distortion of loudspeaker 101. In such embodiments, modeling is typically performed with an artificial learning architecture, such as an artificial neural network, to characterize loudspeaker 101. However, as described above, conventional techniques for characterization of loudspeaker 101, i.e., computing an impulse response function, generally require loudspeaker 101 and sensor 102 to be disposed in an anechoic chamber. In this way, the artificial neural network modeling loudspeaker 101 only processes an output from loudspeaker 101 that is not mixed with room response 133 and room response 134. According to various embodiments, deconvolution filter generator 103 deconvolves (removes or significantly reduces) a response of reverberant environment 110 (i.e., room response 133 and room response 134) from measured response 122. Thus, loudspeaker 101 can be accurately characterized by an artificial neural network when not disposed in an anechoic chamber.

Figure 4:
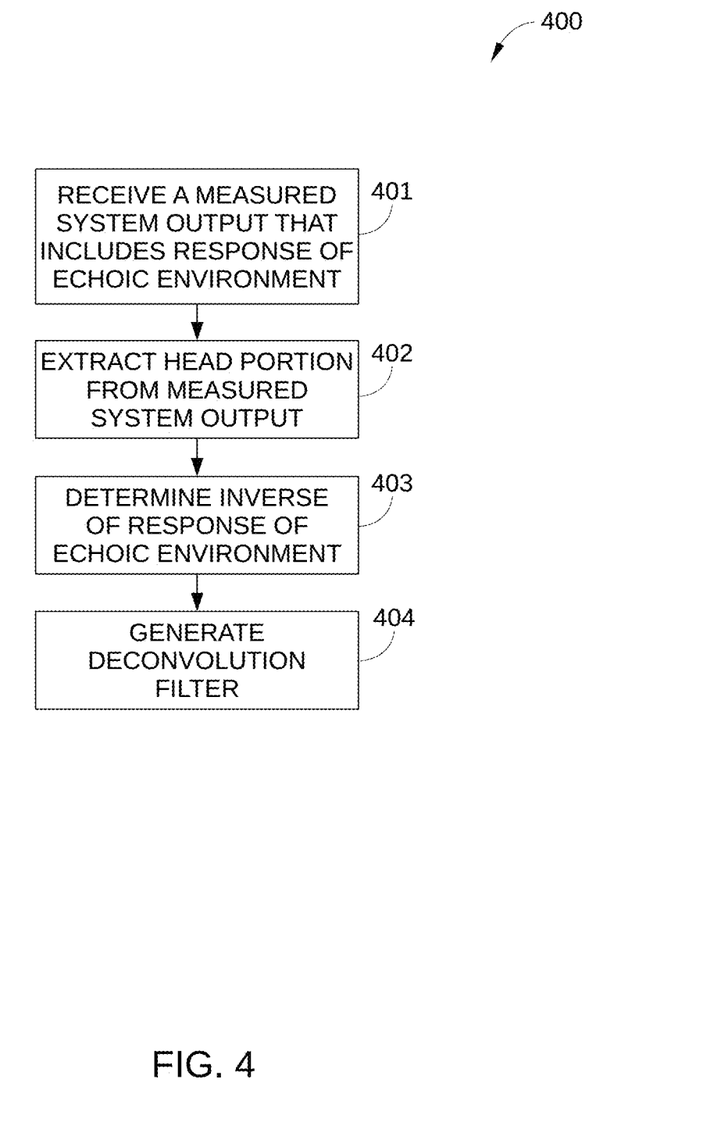
FIG. 4 sets forth a flowchart of method steps for generating a filter for a loudspeaker control system, according to various embodiments.

FIG. 4 sets forth a flowchart of method steps for generating a filter for a loudspeaker control system, according to various embodiments. Although the method steps are described with respect to the systems of FIGS. 1-3, persons skilled in the art will understand that any system configured to perform the method steps, in any order, falls within the scope of the present disclosure.

As shown, a method 400 begins at step 401, in which filter generation system 100 receives a measured system output, such as measured response 122. For example, filter generation system 100 may measure, via sensor 102, a system output signal of loudspeaker 101 while disposed in reverberant environment 110. Thus, sensor 102 receives a plurality of sound waves that include loudspeaker output 131 (i.e., the output signal of loudspeaker 101) and room response 133 and room response 134 (i.e., the output signal of reverberant environment 110 in response to loudspeaker output 131, such as reverberations of loudspeaker output 131). The plurality of sound waves is produced by loudspeaker 101 in response to the application of input stimulus 121, such as an audio signal, to loudspeaker 101. Sensor 102 then generates measured response 122. Input stimulus 121 may be, without limitation, a single sine tone, a multi-tone, one or more different types and/or levels of music, square waves, Farina sweeps, pink noise, or any combination thereof.

In some embodiments, to ensure that an accurate and comprehensive impulse response function can be subsequently computed for loudspeaker 101, filter generation system 100 stores measured response 122 until an amplitude of the impulse falls 60 db or to some predefined level. Thus, filter generation system 100 may store several seconds of measured response 122. Alternatively, filter generation system 100 may store any technically feasible duration of measured response 122 to facilitate accurate computing of an impulse response function for loudspeaker 101.

In step 402, filter generation system 100 extracts head portion 301 from measured response 122. As described above in conjunction with FIG. 3, head portion 301 includes an initial portion of impulse response of loudspeaker 101, and ends proximate truncation point 311. Furthermore, head portion 301 may be selected to include little or no response of reverberant environment 110 (e.g., room response 133 and room response 134), and truncation point 311 may be selected accordingly. Thus, head portion generally does not include the first or subsequent reflections of loudspeaker output 131.

In step 403, filter generation system 100 determines an inverse of the response of reverberant environment 110, based on head portion 301 and measured response 122. The inverse determined in step 403 may be any technically feasible inverse of the contributions to measured response 122 of room response 133 and room response 134. Thus, in some embodiments, the inverse may be an audio signal. Furthermore, given head portion 301, tail portion 302, and measured response 122, any suitable mathematical technique or approach may be employed in step 404 to determine the inverse of the response of reverberant environment 110.

In some embodiments, filter generation module 103 determines such an inverse by computing a first impulse response function for loudspeaker 101 based on head portion 301 and computing a second impulse response function, based on measured response 122, for a system that includes loudspeaker 101 while disposed in reverberant environment 110. In such embodiments, filter generation module 103 then transforms the first impulse response into a first spectrum in the frequency domain and transforms the second impulse response into a second spectrum in the frequency domain. Filter generation module 103 then divides the first spectrum by the second spectrum, and transforms the result of this division to the time domain. The product of this transformation is a time domain filter that can function as an inverse to the contribution of room response 133 and room response 134 to measured response 122.

Alternatively, in some embodiments, filter generation module 103 determines such an inverse by computing a single impulse response function for reverberant environment 110 based on tail portion 302. In such embodiments, filter generation module 103 then transforms the single impulse response into a first spectrum in the frequency domain, inverts the first spectrum, then transforms the result of this inversion back to the time domain. The product of this transformation is a time domain filter that can function as an inverse to the contribution of room response 133 and room response 134 to measured response 122. In some embodiments, a delay may be added to such a time domain filter so that the time domain filter remains causal. For example, in some embodiments, the delay may be substantially equal to time delay 303, shown in FIG. 3.

In step 404, filter generation module 103 generates a deconvolution filter, such as deconvolution filter 601 shown in FIG. 6. For example, in some embodiments, filter generation module 103 stores the deconvolution filter in memory 230. The deconvolution filter can then be implemented in a loudspeaker control system associated with loudspeaker 101 and sensor 102 that corrects for linear and/or non-linear distortion of loudspeaker 101. When such a loudspeaker control system uses the deconvolution filter to process measured response 122 from sensor 102, room response 133 and room response 134 are substantially filtered therefrom, as illustrated in FIGS. 5A and 5B.

Figure 5A:
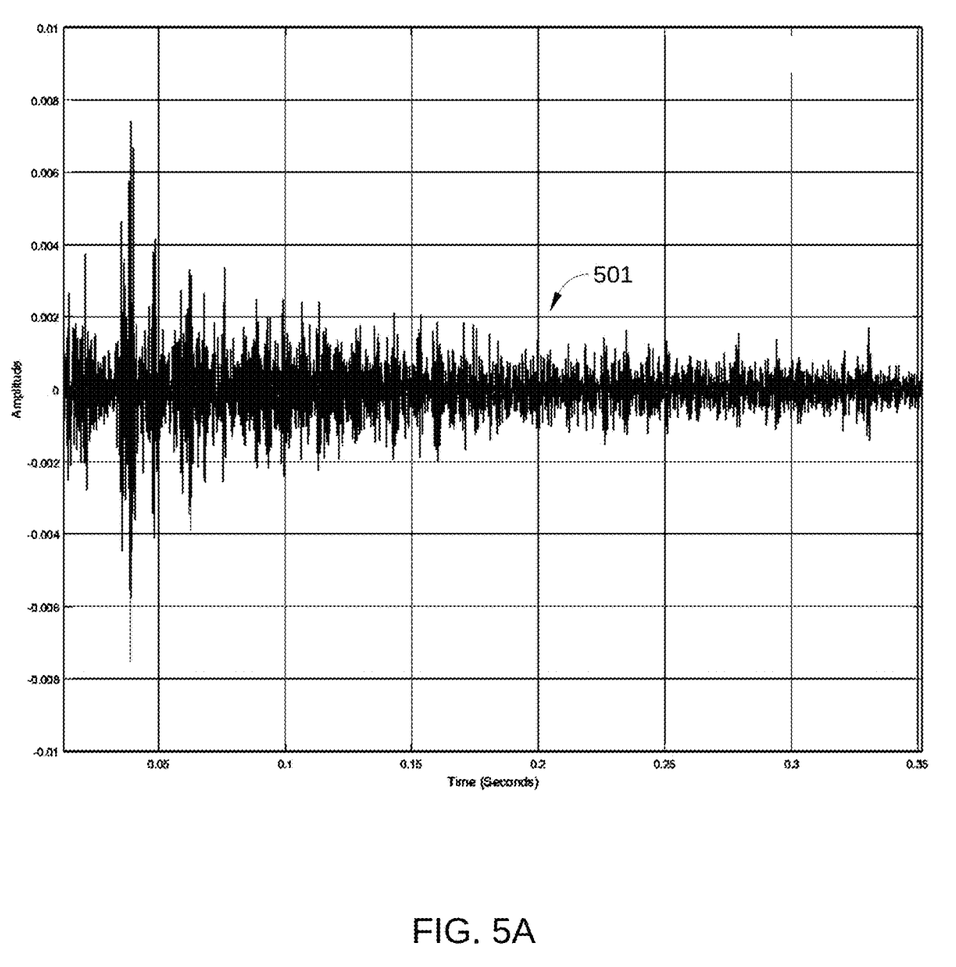
FIG. 5A illustrates a tail portion of a time domain response of a loudspeaker in the filter generation system of FIG. 1 recorded by a sensor, according to various embodiments.
Figure 5B:
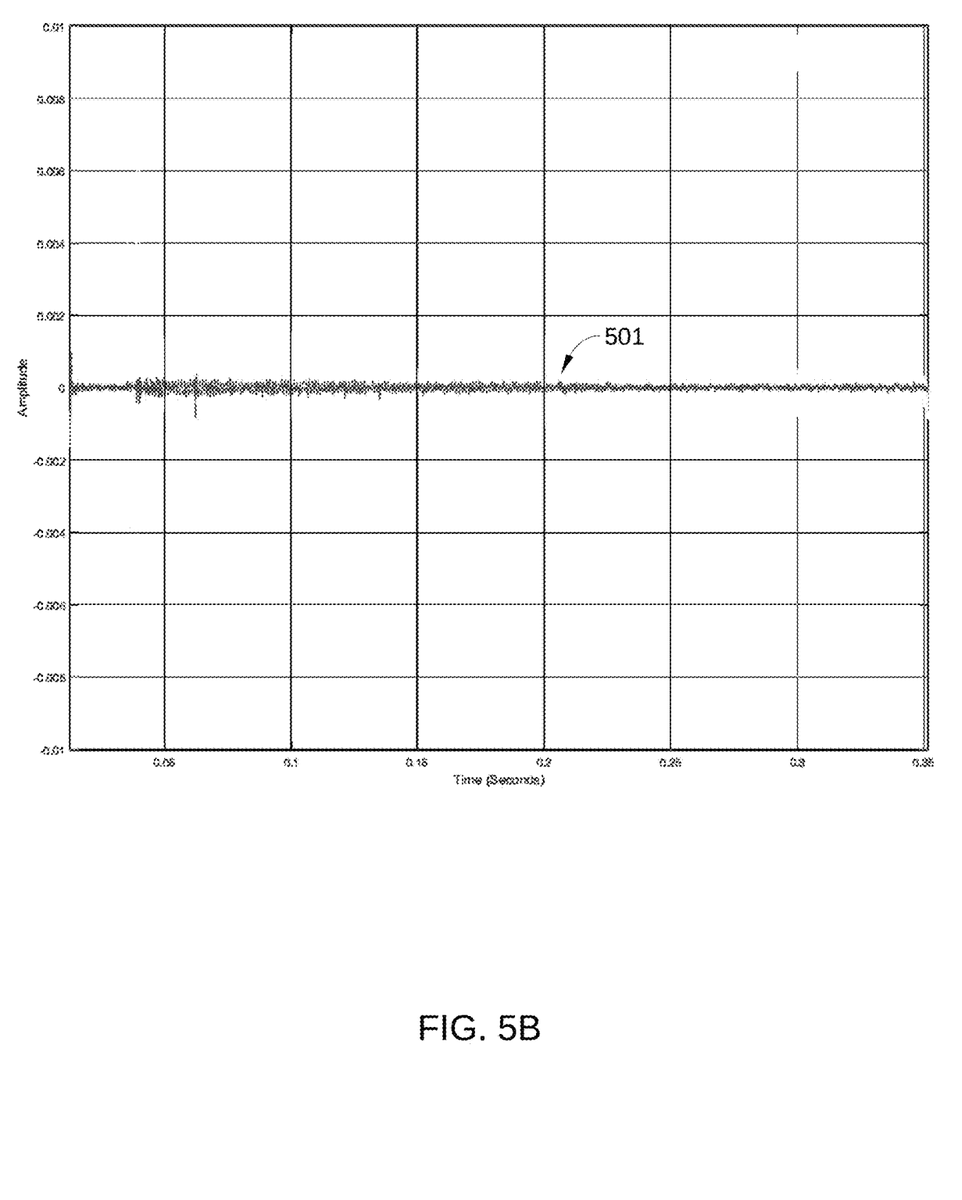
FIG. 5B illustrates the tail portion of FIG. 5A after being filtered with a deconvolution filter, according to various embodiments.

FIG. 5A illustrates a tail portion 501 of a time domain response of loudspeaker 101 recorded by sensor 102, according to various embodiments. FIG. 5B illustrates tail portion 501 after being filtered with a deconvolution filter, according to various embodiments. As shown, the average amplitude of tail portion 501 in FIG. 5B is reduced by 20 db or more. Consequently, measured response 122, after filtering by a deconvolution filter based on the inverse to the contribution of room response 133 and room response 134 to measured response 122, may be employed by an artificial neural network to accurately characterize the impulse response function of loudspeaker 101, even though loudspeaker 101 is disposed in reverberant environment 110.

FIG. 6 illustrates a loudspeaker system 600 configured to implement one or more aspects of the various embodiments. Loudspeaker system 600 includes, without limitation, loudspeaker 101, sensor 102, reverberant environment 110 with interior surfaces 113 and 114, and computing device 120, each of which is described above in conjunction with FIG. 1. In addition, loudspeaker system 600 includes a deconvolution filter 601 and an artificial neural network 602, each of which may reside in computing device 120. Furthermore, in some embodiments, loudspeaker system 600 includes loudspeaker control algorithm 610, which is shown in FIG. 1.

Deconvolution filter 601 is configured to generate a filtered loudspeaker response 621 by processing measured response 122, which is generated by sensor 102. In some embodiments, deconvolution filter 601 may be a finite impulse response (FIR) filter. In such embodiments, the input-output mapping for deconvolution filter 601 is given by the following equation, where y(n) is the output of deconvolution filter 601, x(n) is the input of deconvolution filter 601, h(n) is the filter response of deconvolution filter 601, M is the length of the filter, and N is the length of the input signal: $y(n)=\Sigma_{k=0}^{M} h(n-k)x(k) n=0, 1, 2 \ldots, (N+M-1)$ Artificial neural network 602 is configured to accurately model the input/output behavior of loudspeaker 101. For example, and without limitation, in some embodiments, artificial neural network 602 is configured to process input stimulus 121 to generate, via a neural network model, a neural network output 622 that approximates the filtered loudspeaker response 621. Neural network output 622 is then compared to filtered loudspeaker response 621 to generate an error value 623 that is passed back to artificial neural network 602 to generate an updated neural network output 622, thereby improving the accuracy with which artificial neural network 602 models the nonlinear input/output behavior of loudspeaker 101. This process of training artificial neural network 602 to generate accurate neural network output 621 may be performed in real-time and/or over a series of training iterations. Consequently, the impulse response function of loudspeaker 101 can be accurately modeled even though loudspeaker 101 is disposed in reverberant environment 110 and measured response 122 includes room response 133 and room response 134 combined with loudspeaker output 131.

Artificial neural network 602 may be implemented in any technically feasible fashion. For example, and without limitation, artificial neural network 602 may include a cascade correlation neural network architecture, a recurrent cascade neural network architecture, a recurrent neural network architecture, a MultiLayer Perceptron neural network architecture, or any other type of artificial learning architecture. Further, artificial neural network 602 may be configured to "learn" in any manner that is consistent with the neural network architecture implemented by artificial neural network 602. For example, and without limitation, artificial neural network 602 may be configured to minimize a least squares error cost function.

Loudspeaker control algorithm 610 is configured to control loudspeaker system 600 with deconvolution filter 601 and artificial neural network 602. Loudspeaker control algorithm 610 may reside in computing device 120 and be implemented in any technically feasible fashion. For example, and without limitation, Loudspeaker control algorithm 610 may be a software module that is run by computing device 120, firmware included in computing device 120, or hardware included in computing device 120, such as an ASIC, an FPGA, or any combination thereof.

Figure 7:
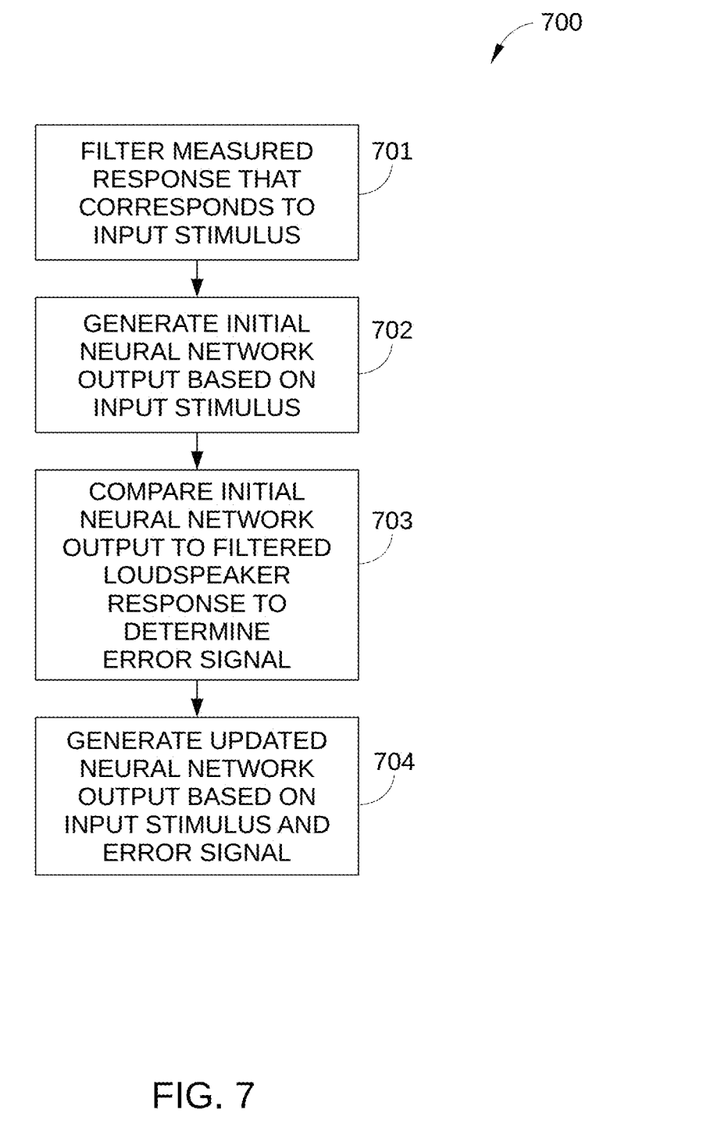
FIG. 7 sets forth a flowchart of method steps for generating a deconvolution filter for a loudspeaker control system, according to various embodiments.

FIG. 7 sets forth a flowchart of method steps for controlling a loudspeaker system with an artificial neural network, according to an embodiment. Although the method steps are described with respect to the systems of FIGS. 1-6, persons skilled in the art will understand that any system configured to perform the method steps, in any order, falls within the scope of the present disclosure.

As shown, a method 700 begins at step 701, in which loudspeaker control system 600 filters a measured system response of loudspeaker 101 disposed in reverberant environment 110. For example, without limitation, loudspeaker control system 600 filters measured response 122, via deconvolution filter 601, to generate filtered loudspeaker response 621. As noted above, measured response 122 corresponds to an audio input signal, such as input stimulus 121, applied to loudspeaker 101 while loudspeaker 101 is disposed in reverberant environment 110. Because deconvolution filter 601 is based on an inverse of a response of the reverberant environment, i.e., an inverse of the contributions of room response 133 and room response 134 to measured response 122, filtered loudspeaker response 621 is an accurate approximation of loudspeaker output 131.

In step 702, loudspeaker control system 600 generates an initial neural network output 622, via a neural network model, such as artificial neural network 602. Artificial neural network 602 may employ any technically feasible approach for modeling the input/output behavior of loudspeaker 101 based on input stimulus 121.

In step 703, loudspeaker control system 600 compares the initial neural network output 622 to filtered loudspeaker response 621 to determine an error value 623. In step 704, loudspeaker control system 600 generates, via a neural network model, such as artificial neural network 602, an updated neural network output 622 based on input stimulus 121 and error value 623. Generally, as artificial neural network 602 continues to process different input stimuli 121, measured loudspeaker responses 122, and error values 623, artificial neural network 602 "learns," iteratively modifying and, thereby, improving the mapping between input stimulus 21 and measured loudspeaker response 122.

In the embodiments described above, a loudspeaker system includes a single loudspeaker and a single sensor or microphone, and a single deconvolution filter is generated for and employed by the loudspeaker system. In other embodiments, a loudspeaker system may include multiple loudspeakers and/or multiple sensors. In such embodiments, one deconvolution filter may be generated for each loudspeaker/sensor pairing. For example and without limitation, in an embodiment in which a loudspeaker system includes three loudspeakers and one sensor, three different deconvolution filters may be generated—one for each loudspeaker/sensor pairing. Similarly, in an embodiment in which a loudspeaker system includes two loudspeakers and two sensors, four different deconvolution filters may be generated. In such embodiments, each such deconvolution filter is preferably generated individually. Thus, the deconvolution filter associated with a first loudspeaker and a first sensor is generated by applying an input stimulus only to the first loudspeaker, and the measured system response used to generate the deconvolution filter is the sensor output from the first sensor. Furthermore, in such embodiments, during operation of the loudspeaker system, each convolution filter is generally implemented simultaneously, and is used to filter only the corresponding sensor output. Consequently, loudspeaker systems that are more complex than loudspeaker system 600 in FIG. 6 can readily benefit from embodiments described herein.

In sum, a deconvolution filter can be generated for a loudspeaker system that is disposed in a reverberant environment and includes a control system configured to correct for linear and/or non-linear distortion of a loudspeaker. The deconvolution filter is configured to remove the contribution of room response to the output of the loudspeaker system. Advantageously, the control system can be trained to remove distortion in loudspeaker response, even though reverberations can be generated in the reverberant environment that would normally be mixed with the response of the loudspeaker and prevent accurate training of the control system.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A non-transitory computer-readable storage medium including instructions that, when executed by one or more processors, configure the one or more processors to control a loudspeaker system with an artificial neural network, by performing the steps of:
    filtering, with a deconvolution filter, a measured system response of a loudspeaker and a reverberant environment in which the loudspeaker is disposed to generate a filtered response, wherein the measured system response corresponds to an audio input signal applied to the loudspeaker while the loudspeaker is disposed in the reverberant environment;
    generating, via a neural network model, an initial neural network output based on the audio input signal;
    comparing the initial neural network output to the filtered response to determine an error value; and
    generating, via the neural network model, an updated neural network output based on the audio input signal and the error value.

2. The computer-readable storage medium of claim 1, wherein the deconvolution filter is based on an inverse of a response of the reverberant environment.

3. The computer-readable storage medium of claim 2, wherein the response of the reverberant environment includes a response to an output of the loudspeaker while the loudspeaker is disposed in the reverberant environment.

4. The computer-readable storage medium of claim 3, wherein the inverse of the response is determined based on a head portion of a system response of the loudspeaker when disposed in the reverberant environment and on the system response of the loudspeaker when disposed in the reverberant environment.

5. The computer-readable storage medium of claim 1, wherein the initial neural network output is configured to approximate the filtered response.

6. The computer-readable storage medium of claim 1, wherein the measured system response comprises at least one reverberation of an output of the loudspeaker.

7. A system, comprising:
    a loudspeaker disposed in a reverberant environment;
    a memory storing a loudspeaker control algorithm; and
    one or more processors that are coupled to the memory and, when executing the loudspeaker control algorithm, are configured to:
    filter, with a deconvolution filter, a measured system response of the loudspeaker and the reverberant environment to generate a filtered response, wherein the measured system response corresponds to an audio input signal applied to the loudspeaker while the loudspeaker is disposed in the reverberant environment;
    generate, via a neural network model, an initial neural network output based on the audio input signal;
    compare the initial neural network output to the filtered response to determine an error value; and
    generate, via the neural network model, an updated neural network output based on the audio input signal and the error value.

8. The system of claim 7, further comprising a sensor that is disposed in the reverberant environment and is configured to generate the measured system response.

9. The system of claim 7, wherein the deconvolution filter is based on an inverse of a response of the reverberant environment.

10. The system of claim 7, wherein the response of the reverberant environment includes a response to an output of the loudspeaker while the loudspeaker is disposed in the reverberant environment.

11. The system of claim 10, wherein the inverse of the response is determined based on a head portion of a system response of the loudspeaker when disposed in the reverberant environment and on the system response of the loudspeaker when disposed in the reverberant environment.

12. The system of claim 7, wherein the initial neural network output is configured to approximate the filtered response.

13. The system of claim 7, wherein the measured system response comprises at least one reverberation of an output of the loudspeaker.

14. A method for controlling a loudspeaker system with an artificial neural network, by performing the steps of:
    filtering, with a deconvolution filter, a measured system response of a loudspeaker and a reverberant environment in which the loudspeaker is disposed to generate a filtered response, wherein the measured system response corresponds to an audio input signal applied to the loudspeaker while the loudspeaker is disposed in the reverberant environment;
    generating, via a neural network model, an initial neural network output based on the audio input signal;
    comparing the initial neural network output to the filtered response to determine an error value; and generating, via the neural network model, an updated neural network output based on the audio input signal and the error value.

15. The method of claim 14, wherein the deconvolution filter is based on an inverse of a response of the reverberant environment.

16. The method of claim 15, wherein the response of the reverberant environment includes a response to an output of the loudspeaker while the loudspeaker is disposed in the reverberant environment.

17. The method of claim 16, wherein the inverse of the response is determined based on a head portion of a system response of the loudspeaker when disposed in the reverberant environment and on the system response of the loudspeaker when disposed in the reverberant environment.

18. The method of claim 14, wherein the initial neural network output is configured to approximate the filtered response.

19. The method of claim 14, wherein the measured system response comprises at least one reverberation of an output of the loudspeaker.

* * * * *